United States Patent Office 3,430,129
Patented Feb. 25, 1969

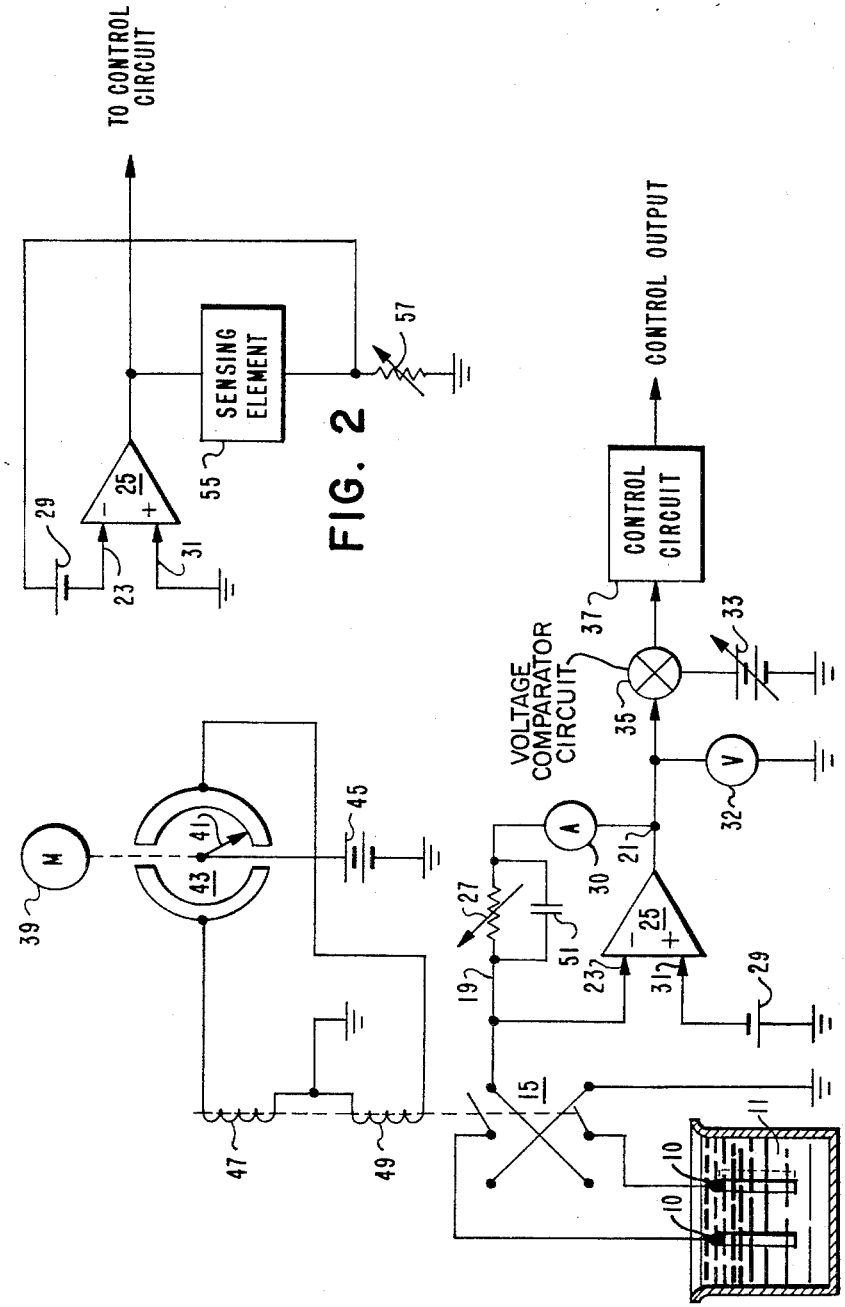

3,430,129
LOW LEVEL SENSING AND CONTROL CIRCUIT
Charles P. Cardeiro, Santa Ana, Calif., assignor, by mesne assignments, to Universal Interloc, Inc., Trevose, Pa., a corporation of Pennsylvania
Filed Jan. 4, 1966, Ser. No. 518,588
U.S. Cl. 324—30
Int. Cl. G05d 11/13
24 Claims

ABSTRACT OF THE DISCLOSURE

An operational amplifier circuit employs a feedback arrangement having a voltage divider arrangement consisting of a variable impedance element for sensing low power current-potential relationships connecting in series with a fixed impedance to feedback only a small portion of the amplifier output signal for comparison at the amplifier input with a fixed reference voltage, so that a fixed small voltage or current is maintained at the sensing element and the output voltage is varied at a high level to remain directly proportional to the resulting current or voltage produced by the fixed value being maintained.

Description

This invention relates to circuits for automatically sensing and utilizing low level current-potential relationships, and more particularly to circuits employing an operational amplifier for automatically sensing low power current-potential relationships, such as those employed to monitor corrosion tendencies, and providing an output with sufficient power for control purposes.

Various conditions are monitored and controlled through the use of sensing elements providing variable current-potential relationships in response to the condition itself or other related factors. Determination of the current-potential relationship, which is obtained by comparing the current flow and the voltage across the sensing element, provides an indirect indication of the particular condition to which the sensing element responds. For automatic recording and control purposes, the current-potential relationships can best be obtained by maintaining either a fixed voltage across or a fixed current flow through the sensing element while measuring only the resulting current or voltage. Since one quantity is maintained constant, amplitude variations of the other measured quantity thus accurately represent changes in the current-potential relationship, and the measured quantity can be recorded as indicative of the condition or used for control purposes.

In such arrangements, low power consumption by the sensing element is always desirable from the standpoint of efficiency and economy. On the other hand, certain conditions can only be sensed by using very small voltages and currents, and low power levels sometimes serve to minimize inaccuracies and even to prolong the usefulness of the sensing element. However, low level voltage and current signals cannot be used directly to actuate most control devices, and normally substantial amplification of the signal is necessary, even for operating most types of recorders.

Most automatic control systems using current-potential relationship type sensing elements use a sensing circuit that acts to maintain either a constant current or a constant voltage at the sensing element and provide the other variable quantity as an output signal. The low power level of this output signal obtained from the sensing circuit is only usable directly for control purposes if applied to an extremely sensitive control device. However, such sensitive control devices are usually deemed impractical since they tend to be either too expensive or unreliable for most systems, and often require frequent maintenance and adjustment. Preferably, a separate amplifier circuit or recorder-controller is used to amplify the output signal to provide power sufficient for ordinary recording and control purposes.

It is an object of the present invention to provide an improved circuit for sensing current-potential relationships to be used in automatic control systems.

Another object of the present invention is to provide an improved circuit for sensing low level current-potential relationships, which circuit employs a single operational amplifier both for maintaining a fixed current or potential at the sensing element and for amplifying the resulting voltage or current to be used directly for recording and control purposes.

Yet another object of the present invention is to provide an improved circuit for sensing low level current-potential relationships, whereby the output can be used directly for recording and control purposes, without the use of extremely sensitive recorders and control devices.

Still a further object of the present invention is to provide an improved and less expensive control circuit responsive to measurements of low level current-potential relationships.

A more particular object of the present invention is to provide an improved and less expensive instrument for sensing and controlling corrosion tendencies in aqueous systems.

These and other objects are accomplished in accordance with this invention by a circuit in which an operational amplifier operates through a unique feedback arrangement to maintain either the current or voltage at the sensing element at a constant low level, while also providing a greatly amplified output signal indicative of the current-potential relationship. A two part voltage divider, with the sensing element as one part, is coupled to the output of the operational amplifier to feed back only a small portion of the output signal through a fixed voltage reference. To achieve stability the operational amplifier automatically adjusts its output so that the small portion of the output voltage fed back exactly matches the reference potential. If the small feedback voltage is developed across the sensing element, then the circuit operates to maintain a constant applied voltage across the sensing element equal to the reference potential while providing a relatively large output voltage indicative of the amplitude of the current flow through the sensing element. On the other hand, if the feedback voltage is developed across a fixed resistance many times smaller than the effective resistance of the sensing element, then a constant current flow is maintained through the sensing element constituting the other part of the voltage divider. In both cases, the output of the operational amplifier represents the variable current or voltage being sensed and sufficient power is provided for use directly for common recording or control purposes.

In accordance with a more particular aspect of this invention, this unique operational amplifier circuit can be employed to automatically sense and control corrosion tendencies in conducting solutions by monitoring current-potential relationships between appropriate sensing electrodes. Certain relationships have been recognized between the corrosion occurring in a conducting solution and the current-potential relationship existing between two or more externally polarized electrodes immersed in that solution. By applying a small polarizing potential and measuring the current flow between electrodes, a qualitative if not quantitative indication of a corrosion tendency of a solution can be obtained. Several sensing instruments have been devised for this purpose, both in automatic and manual form, which make available the voltage or current being measured between the electrodes as an output for recording or control purposes. However, the polarizing potential between the electrodes must be kept very small, normally in the range from zero to a hundred millivolts, since higher voltage levels tend to mask or actually disrupt the naturally occurring corrosive action on the electrodes. Moreover, higher polarizing potentials tend to cause a build up of electrolysis products on the electrodes which would retard natural corrosive action at their surfaces and also accelerate the loss of electrode materials into solution. Therefore, because of the low power sensing level maintained, the output signals available from previous sensing instruments were not directly usable to actuate a control device, but had first to be greatly amplified by external circuitry to provide a useful control output. In accordance with this particular aspect of the invention, the corrosion sensing electrodes are connected in a voltage divider circuit coupled to the output of the operational amplifier. In a particular embodiment, the voltage developed across the electrodes is applied as a feedback signal through a reference source providing a fixed potential within the prescribed millivolt range. The other part of the voltage divider is a fixed resistor having many times the resistance of the effective polarization resistance between the electrodes. With this arrangement, the amplifier output voltage automatically changes to provide a current flow through the voltage divider circuit sufficient to maintain the voltage across the electrodes constant at the level established by the reference potential source, and the output voltage from the operational amplifier is almost directly proportional to the current flow between the electrodes and has sufficient power to be used directly for control purposes.

These and other aspects of the invention, as well as the invention itself, can best be understood by referring to the following detailed description of certain embodiments taken in conjunction with the accompanying drawings, in which:

FIGURE 1 is a schematic diagram of one embodiment of a system for sensing and controlling corrosion tendencies in conductive solutions, which system includes an improved circuit for sensing current-potential relationships and providing a control output; and, FIGURE 2 is a schematic diagram of an alternative form of a circuit for sensing low level current-potential relationships and providing a control output in accordance with the invention for use in automatic control systems such as shown in FIG. 1.

Referring now to FIG. 1, a pair of electrodes 10 are immersed in a conductive solution to measure or sense variations in the corrosion tendencies of the solution. Typically, both electrodes 10 are formed of the same metal, with the size and shape of each electrode and the metallic composition being selected to suit a particular application. An indication or measure of the corrosion tendencies can be obtained by applying a small fixed polarizing potential below a hundred millivolts across the two electrodes 10, and then measuring the resulting current flow between the electrodes to establish the existing current-potential relationship.

As a practical matter, the amplitude of the interelectrode current flow depends on many factors besides the corrosion tendencies of the solution 11, including the size, shaping and spacing of the electrodes 10 relative to one another as well as the conductivity of the solution 11. However, assuming that these factors remain relatively constant or are maintained within narrow limits, increasing current flow between the electrodes 10 is usually directly attributable to an increase in the corrosion tendencies of the solution 11. Generally, if the size, shape and spacing of the electrodes 10 and the conductivity of the solution is known, it is possible either by direct calculation or by use of certain empirical graphs to obtain a rough but useful measure of the naturally occurring corrosion rate occurring at the surface of the electrodes and similar materials in contact with the solution.

However, while the actual corrosion rate is of interest primarily in certain testing and laboratory work, the current-potential relationships measured between the electrodes 10 have practical applications in automatic control systems, such as those described in the copending patent application, Ser. No. 423,715, filed Jan. 6, 1965, and issued as United States Patent No. 3,361,150 on Jan. 2, 1968 by Jack E. Horner, and assigned to the assignee of the present invention, which operate to control the addition of chemicals to circulating liquids to suppress corrosive tendencies in the liquid and prevent corrosion damage to the circulating system. In the particular automatic control systems described in this copending patent application, which are primarily intended to suppress corrosion and scale formation in recirculating water systems, the corrosion tendency of the recirculating water is automatically sensed to insure that the pH conductivity and corrosion inhibitor concentration are being maintained at proper levels by other automatic control instruments in the system. Should the measured current flow between the sensing electrodes 10 exceed a preselected value, then a solenoid control circuit is actuated to restore automatically a non-corrosive condition in the recirculating system. Thus, the corrosion sensing circuitry acts as a fail-safe interlock, and by recording the measured current variations on an appropriate time scale for comparison with recordings made of the operation of the other instruments, valuable data concerning the overall operation of the various systems can be gathered and studied for the purpose of achieving maximum operational efficiency. It is, however, necessary, in this system and other similar automatic recording and control applications, to amplify the small current flow being measured between the electrodes, which normally does not exceed a hundred microamperes, in order to obtain a signal with sufficient power for most recorders and control devices. Otherwise, very sensitive recording and control devices, which are capable of operating at these very low power levels must be used, and these tend to be very costly and rather unreliable.

In the embodiment shown in FIG. 1, the metal electrodes 10 are connected to the movable contacts of a double-pole, double-throw switch 15 which may be used to reverse the polarization periodically for the reasons herein after pointed out. With the switch closed in either position, one of the electrodes 10 is connected directly to ground or common potential, and the other electrode is coupled through a variable resistor 27 to the output terminal 21 of an operational amplifier 25, sometimes known as a "direct coupled differential amplifier." These amplifiers have very high input impedance and gain capability. The feedback resistor 27 and the resistance between the electrodes 10 form a voltage divider circuit between the output of the operational amplifier 25 and ground. Preferably a fixed reference potential source 29 is connected between ground and the positive input terminal 31 of the operational amplifier 25, or alternately between the center terminal of the voltage divider and the negative input terminal 23 with the positive input terminal 31 being grounded. With either arrangement the voltage between the electrodes 10 is maintained within very close limits equal to that of the reference potential source 29. Assuming that the voltage between the electrodes 10 were not equal to the reference voltage, then a voltage difference signal would be applied across the input terminals 31 and 32 to cause the output voltage of the operational amplifier 25 to be displaced in a direction to change the current flow through the voltage divider circuit so that these two voltages would become equal.

In this embodiment, the feedback resistor 27 has a resistance value many times larger than the expected polarization resistance between the electrodes 10. Thus, only a very small portion of the total amplifier output voltage developed across the voltage divider is fed back, in effect, to balance the reference potential. Since the input impedance of the operational amplifier 25 is extremely high, the input current is negligible, normally less than $10^{-6}$ amperes. Therefore, for all practical purposes, the same current that flows between the electrodes 10 also flows through the feedback resistor 27 and the voltage developed across the feedback resistor 27 is directly proportional to the current flow between the electrodes 10. Thus, the current flow between the electrodes 10 can either be measured directly by placing a sensitive microammeter 30 in series with the feedback resistor 27, or more easily, by connecting an ordinary voltmeter (not shown) with a sufficiently high impedance and an appropriate scale to measure the relatively high voltage developed across the feedback resistor 27. Preferably though, an ordinary voltmeter 32 or recorder can be coupled directly to the amplifier output to indicate the amplitude of the output voltage. Of couse, the total output voltage is only approximately proportional to the current flow between the electrodes. Although the voltage developed across the feedback resistor 27 portion of the voltage divider is by far the greater proportion of the total output signal, the fixed polarization voltage established between the electrodes is also included. But usually this small discrepancy in proportionality can just be ignored completely or compensated simply by adjusting the scale on the meter or recorder to read lower by an amount equal to the reference potential.

To illustrate a practical circuit arrangement in accordance with this embodiment of the invention, assume that a full scale output signal of five volts is desired and that the expected maximum current flow between the electrodes due to the applied polarizing voltage is one hundred microamperes. It is then simply a matter of using Ohm's law to calculate the value of the feedback resistor needed to yield the desired output voltage. Dividing one hundred microamperes into five volts gives a resistance value of 50,000 ohms for the feedback resistor 27. Since the polarizing potential across the electrodes is usually one hundred millivolts or less, the discrepancy that results from measuring the entire output voltage would in this case be only two percent or less at full scale, and need not normally be compensated to maintain exact proportionality with the measured current flow.

This sensing circuit also provides another very practical advantage in that it permits use of a single range voltmeter or voltage sensitive recorder to cover a wide range of current measurements. If the feedback resistor 27 is selectively variable, as shown in the drawing, its resistance can be selected to provide any desired proportionality between the electrode current being measured and the output voltage. Therefore, within practical limits, almost any range of current between the electrodes can be monitored with a single range voltmeter or recorder, and indicated by simply changing the indicator scale to suit the resistance setting of the feedback resistor 27.

The output from this corrosion sensing circuit can be used to energize solenoids and most other common control devices. In automatic control systems, such as those described in the patent application previously mentioned, the amplitude of the sensing circuit output is compared to that of a variable reference source 33 in an appropriate voltage comparator circuit 35 which generates a signal for actuating a control circuit 37. The comparison circuit 35 and the control circuit 37 may constitute any convenient arrangement capable of providing an on-off switching or proportional type operation in response to the voltage difference between the sensing circuit output and the set level established by the reference source 33. For example, to provide the switching operation needed for the automatic control system, the sensing circuit output is simply compared with the set level by means of a conventional two-transistor difference amplifier that generates an output signal only when the sensing circuit output exceeds by a small amount the voltage level set by the reference source 33. The actuating signal generated is then used to turn on a switching transistor coupled in series with the desired solenoid relay devices. The resulting current flow through the switching transistor and relay coils provides the desired opening and closing of contacts.

Previously, a periodic reversal of the applied polarization voltage across the electrodes 10 was considered necessary both in sensing corrosion tendencies for control purposes and in measuring corrosion rate. In the previous automatic systems and automatic corrosion measuring instruments of this type, the movable contacts of the switch 15 were periodically reversed at preselected time intervals. This reversal can be accomplished with a rather simple arrangement in which a constant speed timing motor 39 rotates a wiper 41 at a fixed speed, for example, one revolution per minute, to contact first one and then the other roughly semicircular conductive segments of a wafer switch 43. In this way, power source 45 connected to the wiper 41 supplies current to a first relay coil 47 for approximately one half of each revolution to hold the switch in one position, and then to a second relay coil 49 for approximately the other half of each revolution to hold the switch 15 in the reverse position.

Each polarization reversal initially produces an unstable condition in which the current-potential relationship between the electrodes 10 varies radically while polarization is being achieved. A condition of relative equilibrium may usually be achieved in approximately fifteen to thirty seconds after the voltage is initially applied. When this equilibrium condition is reached, a stable or nearly stable current-potential relationship exists in which the current flow between the electrodes 10 is constant or changes at a relatively slow constant rate.

Initially, the current flow is rather high after each polarization reversal while many of the electrolysis effects produced by the preceeding polarization of the electrodes are being reversed. Therefore, the current measurement or control operation should be delayed a fixed interval, usually between ten and twenty-five seconds after the polarization reversal, to insure that approximately the same equilibrium condition exists each time. Any suitable delay circuit or other timing arrangement may be used for this purpose to operate a gate for the actuating signal or maintain the recorder and control devices inoperative for the necessary interval.

To reduce the effects of noise in the sensing circuit output, a capacitor 51 may be connected in parallel across the feedback resistor 27. Usually the capacitor 51 is chosen with respect to the value of the feedback resistor to give a RC time constant in the order of several seconds. In this manner, the stabilized output is smoothed by integration for a few seconds prior to its recording or use for control purposes.

Often, the current flow between the electrodes 10 when the electrodes are polarized in one direction differs from that obtained from polarization in the other direction, and the difference between successive readings taken in opposite directions is actually indicative of the pitting tendencies of the solution. In determining the actual corrosion rate, the average of two successive readings should be used, but in the automatic control system application this is not important since the primary purpose is to minimize damage to metal in contact with the circulating liquid, whether the damage is due to pitting or natural corrosion. Therefore, when either reading exceeds the preselected set level, the control function can and should be initiated to minimize the corrosive tendencies of the liquid.

However, as more recently discovered, the necessary automatic system control functions can be performed just as well without reversing the polarization of the electrodes 10. Thus, the switch 15 and its associated timing equipment can be eliminated, and opposite electrodes 10 permanently connected to ground potential and to the sensing circuit. However, if the polarization remains in one direction, there is a constant metal loss from the positively polarized electrode and not from the other. To compensate, the poistive electrode may be made substantially thicker than the other electrode so that it does not have to be replaced too often. In most cases, the metal material forming the electrodes 10 is selected to be the same or very similar to the metal elements in contact with the circulating liquid, so that the corrosion activity being monitored on the surface of the electrodes corresponds as nearly as possible to that occurring in the rest of the circulation path.

Referring now to FIG. 2, an alternative form of sensing circuit may be used in accordance with the invention to measure low level current-potential relationship by maintaining a constant low level current flow through a sensing element 55, and providing an output signal indicative of the resulting voltage developed across the sensing element 55. This alternative arrangement is probably most useful for sensing elements in which the resistance range is rather high, such as thermistors, strain gauges, photoresistors and the like. The necessity for low power sensing signals can be particularly important in sensing low temperatures with thermistor elements since any heat generated by electrical power consumption in the thermistor itself may adversely affect the accuracy of the readings obtained.

As in the circuit of FIG. 1, a two-part voltage divider circuit consisting of the sensing element 55 and a fixed resistor 57 is connected across the output of the operational amplifier 25. However, in this arrangement, the positions of the sensing element and fixed resistor are reversed with the sensing element 55 corresponding to the feedback resistor and the voltage developed across the fixed resistor 57 being fed back, in effect, to balance the reference potential source 29. The positive input terminal 31 of the operational amplifier 25 is grounded.

The operation of this circuit is such that, assuming the voltage to be developed across the resistor 57 were not equal to the potential of the reference source 29, then an input signal equal to the voltage difference would be applied to the minus input terminal 23 of the operational amplifier 25, causing the output voltage to be displaced in the direction necessary to equalize the two voltages. Since the resistance of the variable resistor 57 remains fixed once selected, a constant current flow is maintained through the voltage divider, and thus the sensing element 55, since the input current to the operational amplifier 25 is negligible, even though the resistance of the sensing element may vary over a considerable range. The constant current flow maintained can be computed by dividing the selected resistance of the variable resistor 57 into the voltage of the reference source 29. In this arrangement though, the voltage developed across the sensing element 55, which is the quantity being measured, is not amplified at the output of the operational amplifier 25. However, this circuit does provide an output having ample power for recording and control purposes. By selecting a resistance value with the variable resistor 57 many times smaller than the resistance of the sensing element 55, almost the entire output voltage of the amplifier 25 is developed across the sensing element, and is normally of a magnitude sufficient to be used directly for control purposes. It is obvious that, in measuring current-potential relationships across high impedance sensing elements, measuring the relatively high potential developed across the sensing element by a constant current flow is to be greatly preferred over the alternative method of maintaining a constant high voltage and then attempting to measure or utilize the extremely low resulting current flow. Moreover, any current drawn by a control device or recorder connected to the output will not affect the maintenance of the constant current flow through the sensing element 55, so that the sensing circuit in effect provides an amplification of available output power.

Although specific embodiments of the invention have been described herein for the purpose of illustrating the invention, it will be understood that various changes, modifications and equivalent circuit arrangements may be employed, other than those specifically mentioned herein without departing from the scope of the invention as expressed in the appended claims.

What is claimed is:

1. A circuit for sensing and utilizing variable, low level current-potential relationships in a variable impedance sensing element, comprising:

an operational amplifier having input terminals and an output terminal responsive to a voltage difference signal across said input terminals;

a voltage divider circuit consisting of a fixed impedance element and said sensing element connected in series between said output terminal and a ground potential, said fixed impedance element having an impedance value differing by at least an order of magnitude from the minimum impedance of said sensing element, with the voltage divider element having the smaller impedance value connected to said ground potential to provide a feedback voltage at said minimum impedance constituting only a small proportion of the total voltage between said output terminal and said ground potential; and, a low level reference potential source coupled directly to one of said input terminals, said ground potential and the common connection between the elements of said voltage divider being directly coupled through said reference potential source to provide a voltage difference signal across said input terminals equal to the difference between the voltage of said reference potential source and said feedback voltage, whereby the voltage at said output terminal is varied to maintain a substantially exact correspondence between said feedback voltage and the voltage of said reference potential source.

2. The sensing circuit of claim 1 wherein said fixed impedance element is a selectively variable resistor.

3. The circuit of claim 1 wherein said fixed impedance element is a resistor connected between the output terminal of said operational amplifier and said common connection, whereby a voltage equal to that of said reference potential source is maintained across said sensing element.

4. The circuit of claim 3 wherein said fixed resistor has a resistance value much greater than said sensing element, whereby the voltage amplitude at the output terminal of said operational amplifier is directly related to the current flow through said sensing element and greatly exceeds that maintained across the sensing element.

5. The circuit of claim 1 wherein said sensing element is connected between the output terminal of said operational amplifier and the common connection and said fixed impedance element is a resistor, whereby a constant current flow is maintained through said sensing element.

6. The circuit of claim 5 wherein said resistor has a resistance value many times less than said sensing element, whereby the voltage developed at the output terminal of said operational amplifier closely corresponds to that developed across said sensing element.

7. A system operating in response to a variable condition comprising:

a sensing element responsive to the variable condition to provide a variable current-potential relationship;

an operational amplifier having input terminals and an output terminal;

a voltage divider circuit consisting of said sensing element and a fixed impedance element having an impedance value differing by an order of magnitude from the minimum impedance value of said sensing element connected in series between the output terminal of said operational amplifier and a ground potential with the voltage divider element having the smaller impedance value connected between the ground potential and the common connection between the voltage divider elements to develop a feedback voltage at said minimum impedance constituting only a small proportion of the total potential difference between said ground potential and said output terminal;

a low level source of reference potential coupled directly to one of said input terminals;

circuit means coupling the feedback voltage developed at the common connection and said ground potential through said reference potential source for providing a voltage difference signal across said input terminals indicative of the voltage difference between said reference potential and said feedback potential for causing the voltage at the output terminal to be displaced to equalize said feedback voltage and said reference potential;

and means responsive to the output voltage of the operational amplifier for operating in accordance with selected variations in the amplitude of the output signal.

8. The system of claim 7 wherein said coupling circuit means constitutes a series connection of said reference potential source between said common connection and the input terminal of said operational amplifier.

9. The system of claim 7 wherein said operating means comprises:

a voltage source providing a preselected set level; and means for comparing the voltage at the output terminal of said operational amplifier with said preselected set level to provide an actuating signal indicative of the difference between the voltages being compared.

10. The system of claim 9 wherein said comparing means generates an actuating signal only when the voltage at the output terminal of the operational amplifier exceeds said preselected set level.

11. The system of claim 9 further comprising:

a control device responsive to the actuating signal for effecting control of said variable condition.

12. The system of claim 7 wherein said fixed impedance element is a selectively variable resistor connected between the output terminal of said operational amplifier and said common connection and has a resistance value many times larger than said sensing element, whereby a constant low level voltage is maintained across said sensing element and the voltage at the output terminal is indicative of the current flow through said sensing element.

13. The system of claim 7 wherein said sensing element is connected between the output terminal of the operational amplifier and said common connection and said fixed impedance element has a resistance value many times smaller than said sensing element, whereby a constant low level current flow is maintained through said sensing element and the voltage at the output of the operational amplifier is indicative of the voltage developed across said sensing element.

14. The system of claim 7 wherein said operational amplifier has positive and negative input terminals and wherein said coupling circuit means constitutes a connection of said reference potential to one of said input terminals and a connection of said common connection to the other input terminal.

15. A system for monitoring and controlling corrosion tendencies in a conductive solution comprising:

a sensing element having two spaced metal electrodes for immersion in said solution;

an operational amplifier having input terminals and an output terminal;

a voltage divider circuit consisting of a fixed impedance element and said sensing element connected in series between said output terminal and a ground potential, the resistance between the electrodes when immersed in said solution constituting that portion of the voltage divider circuit between said ground potential and the point of common connection with the fixed impedance element and having a minimum resistance value at least an order of magnitude smaller than said fixed impedance element to provide a feedback voltage from said common connection at said minimum resistance value constituting only a small proportion of the total voltage between said output terminal and said ground potential;

means for providing a preselected reference potential, said ground potential and the feedback voltage from said common connection being directly coupled through said reference potential source to the input terminals of said operational amplifier to provide a voltage difference signal causing said operational amplifier to generate an output voltage for maintaining a substantially exact correspondence between the feedback voltage developed at said common connection and that provided by said reference potential source.

16. The system of claim 15 wherein said fixed impedance element is a selectively variable resistor.

17. The circuit of claim 15 wherein said fixed impedance element is a resistor having a resistance value many times greater than the resistance between the electrodes when immersed in said solution, said resistor being connected between the output terminal of said operational amplifier and said common connection; and wherein said reference potential is in the millivolt range.

18. The system of claim 17 further comprising:

means responsive to the voltage at the output of the operational amplifier for indicating a value indicative of the current flow produced between the electrodes.

19. The system of claim 17 further comprising:

means connected in series with said fixed impedance element for indicating the value of the current flow therethrough.

20. The system of claim 15 further comprising:

switching means for periodically reversing the connection of said electrodes, and wherein said electrodes are of substantially the same size, shape and composition.

21. The system of claim 15 wherein the more positively polarized electrode has a substantially larger cross-sectional dimension than the other electrode, and wherein the voltage across the electrodes is maintained continuously in a single direction.

22. The system of claim 15 further comprising:

a voltage suorce providing a preselected set level; and means for comparing the voltage at the output terminal of said operational amplifier with said preselected set level to provide an actuating signal indicative of the difference between the voltages being compared.

23. The system of claim 22 wherein said comparing means generates an actuating signal only when the voltage at the output terminal at the operational amplifier exceeds said preselected set level.

24. The system of claim 23 further comprising:

a control device responsive to the actuating signal for effecting a reduction in the corrosion tendencies of said conductive solution.

(References on following page)

References Cited

UNITED STATES PATENTS

| | | | |
|---|---|---|---|
| 2,374,088 | 4/1945 | Fontana et al. | 324—30 |
| 3,047,797 | 7/1962 | Borsboom | 324—30 |
| 3,256,901 | 6/1966 | Kline. | |

OTHER REFERENCES

Mueller et al.: Analytical Chemistry, vol. 37, No. 1; January 1965; pp. 13–29; 324–30. (Copy in Group 171, QD71 .I42.)

Booman et al.: Analytical Chemistry, vol. 35, No. 12; November 1963; pp. 1793–1796 of pp. 1793–1809 relied on. (Copy in Gr. 171 (QD71 .I42) with photocopy of pp. 1793–1796 in Gr. 258, 324–30.)

Schwarz et al.: Analytical Chemistry, vol. 35, No. 12; November 1963; pp. 1770–1778. (Copy in Gr. 171 (QD71 .I42) with photocopy in Gr. 258 (324–30).)

Handbook of Operational Amplifier Applications; first edition; copyright 1963 by Burr-Brown Research Corporation, P.O. Box 6444, Tucson, Ariz., 85716; pp. 2, 3 and 10 to 15 of pp. 1–86 relied on. Photocopy of pp. above in Gr. 258, 324–123.

RUDOLPH V. ROLINEC, *Primary Examiner.*

C. F. ROBERTS, *Assistant Examiner.*

U.S. Cl. X.R.

137—93